(12) United States Patent
Guo et al.

(10) Patent No.: US 9,647,409 B2
(45) Date of Patent: May 9, 2017

(54) ULTRA-WIDEBAND SUPERCONTINUUM LIGHT SOURCE BASED ON DUAL-BAND FIBER LASER

(71) Applicant: SHENZHEN UNIVERSITY, Shenzhen, Guangdong (CN)

(72) Inventors: Chunyu Guo, Guangdong (CN); Shuangchen Ruan, Guangdong (CN); Huaiqin Lin, Guangdong (CN); Liang Wen, Guangdong (CN); Deqin Ouyang, Guangdong (CN); Jun Yu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/060,626

(22) Filed: Mar. 4, 2016

(65) Prior Publication Data
US 2016/0190764 A1    Jun. 30, 2016

Related U.S. Application Data

(63) Continuation of application No. PCT/CN2015/078698, filed on May 11, 2015.

(30) Foreign Application Priority Data

Aug. 6, 2014 (CN) .......................... 2014 1 0385054

(51) Int. Cl.
*H01S 3/067* (2006.01)
*H01S 3/108* (2006.01)
(Continued)

(52) U.S. Cl.
CPC .............. *H01S 3/067* (2013.01); *G02F 1/353* (2013.01); *H01S 3/06733* (2013.01);
(Continued)

(58) Field of Classification Search
CPC ........ H01S 3/067; H01S 3/06733; H01S 3/23; H01S 3/108; H01S 3/2391; H01S 3/1698;
(Continued)

(56) References Cited

U.S. PATENT DOCUMENTS

| | | | |
|---|---|---|---|
| 6,212,310 B1* | 4/2001 | Waarts | G02B 6/29319 372/43.01 |
| 7,130,512 B2* | 10/2006 | Kuksenkov | G02B 6/02242 385/122 |
| 2011/0279891 A1* | 11/2011 | Miyauchi | H01S 3/06758 359/341.3 |

* cited by examiner

*Primary Examiner* — Xinning Niu

(57) ABSTRACT

The present invention is applicable to the field of fiber laser technologies. In the present invention, two fiber lasers of different bands are used as seed sources to form a dual-band fiber laser that outputs beams of two bands simultaneously, and the dual-band fiber laser is used to pump the cascaded evolving assemblies. Specifically, when the laser beams of the two bands go through a first-stage evolving assembly, the laser of one band is evolved into a visible-to-near-infrared supercontinuum, while the laser of the other band is evolved into an ultra-short pulse; the visible-to-near-infrared supercontinuum and the ultra-short pulse are coupled and enter a second-stage evolving assembly; the ultra-short pulse is further evolved into a near-infrared-to-mid-infrared supercontinuum, in which the visible-to-near-infrared supercontinuum generated at the previous stage is transmitted in a low loss manner; and an ultra-wideband supercontinuum covering visible, near-infrared, and mid-infrared bands is finally output from cascaded fibers.

5 Claims, 1 Drawing Sheet

(51) Int. Cl.
*H01S 3/23* (2006.01)
*G02F 1/35* (2006.01)
*H01S 3/16* (2006.01)
*H01S 3/094* (2006.01)
*H01S 3/00* (2006.01)

(52) U.S. Cl.
CPC ............... *H01S 3/108* (2013.01); *H01S 3/23* (2013.01); *G02F 2001/3528* (2013.01); *G02F 2202/32* (2013.01); *H01S 3/0092* (2013.01); *H01S 3/06754* (2013.01); *H01S 3/094007* (2013.01); *H01S 3/1608* (2013.01); *H01S 3/1618* (2013.01); *H01S 3/1698* (2013.01); *H01S 3/2391* (2013.01)

(58) Field of Classification Search
CPC ............. H01S 3/094007; H01S 3/0092; H01S 3/1608; H01S 3/1618; H01S 3/06754; G02F 1/353; G02F 2001/3528; G02F 2202/32
See application file for complete search history.

ULTRA-WIDEBAND SUPERCONTINUUM LIGHT SOURCE BASED ON DUAL-BAND FIBER LASER

CROSS REFERENCE TO RELATED APPLICATIONS

The present application is a Continuation Application of PCT application No. PCT/CN2015/078698 filed on May 11, 2015, which claims the benefit of Chinese Patent Application No. 201410385054.4 filed on Aug. 6, 2014. All the above are hereby incorporated by reference.

TECHNICAL FIELD

The present invention relates to the field of fiber laser technologies, and in particular, to an ultra-wideband supercontinuum light source based on a dual-band fiber laser, which can be applied to various fields such as biomedicine, remote sensing, environmental monitoring, multichannel fiber communications, and spectroscopy.

BACKGROUND

A fiber supercontinuum light source can generate wideband light featuring high brightness and high coherence, and is equivalent to a wideband laser. The fiber supercontinuum light source has a bright application prospect in fields such as biomedicine, laser spectroscopy, environmental monitoring, and remote sensing.

Ultra-wideband spectral output is a core goal of the study on supercontinuum. However, to generate a wideband supercontinuum, a wavelength of a pump laser should be located in a fiber anomalous dispersion region and be closest to a fiber zero dispersion wavelength (Zero Dispersion Wavelength, ZDW), so that an ultra-short pulse evolved from the pump is easily extended to a normal dispersion region. Currently, a mainstream technology for generating a supercontinuum is pumping a silica fiber or a non-silica fiber by using a 1 μm or 1.5 μm/2 μm high-power fiber laser.

Fibers matching 1 μm ytterbium (Yb)-doped fiber laser are silica photonic crystal fibers (Photonic Crystal Fibers, PCF). By pumping the silica PCF with a 1 μm ytterbium (Yb)-doped fiber laser, a supercontinuum that covers a short-wavelength visible band can be generated, but a powerful infrared absorption function of the silica material restricts the supercontinuum from covering a long wavelength band. Consequently, the spectral energy mainly focuses on visible and near-infrared bands and is difficult to cover a band of over 2.5 μm.

Fibers matching 1.5 μm or 2 μm fiber laser are non-silica glass fibers (fibers made from fluoride, chalcogenide or other materials). In high-power pumping, the non-silica glass fibers can generate a supercontinuum that covers a long-wavelength 5 μm mid-infrared band. However, because the fiber zero dispersion wavelength and the pump wavelength are located at a long-wavelength band of over 1.5 μm, the supercontinuum generated in the non-silica glass fibers is difficult to cover a short wavelength band of less than 0.8 μm, and the spectral energy mainly focuses on an infrared band of over 1 μm.

Therefore, by using a technology in which a single-band laser pumps a fiber made from a single material, the supercontinuum is difficult to extend to a visible band and a mid-infrared band simultaneously, thus hindering the implementation of an ultra-wideband supercontinuum covering visible, near-infrared, mid-infrared bands.

SUMMARY

The technical issue to be solved by the present invention is to provide an ultra-wideband supercontinuum light source based on a dual-band fiber laser to implement an ultra-wideband supercontinuum whose wavelength can cover visible, near-infrared, mid-infrared bands.

The present invention is implemented as follows: An ultra-wideband supercontinuum light source based on a dual-band fiber laser includes:

a first fiber laser, configured to generate a first-band laser beam, where the first-band laser beam is used to be evolved into a visible-to-near-infrared supercontinuum;

a second fiber laser, configured to generate a second-band laser beam, where the second-band laser beam is used to be evolved into a near-infrared-to-mid-infrared supercontinuum;

a wavelength division multiplexer, configured to combine the first-band laser beam and the second-band laser beam;

a silica PCF, one end of which is connected to an output end of the wavelength division multiplexer by using a fiber, and which is configured to output a laser beam after a first-stage non-linear effect is imposed on the combined laser beam, so that the first-band laser beam is evolved into a visible-to-near-infrared supercontinuum and that the second-band laser beam is evolved into an ultra-short pulse with modulation instability; and a non-silica glass fiber, one end of which is connected to an output end of the silica PCF, and which is configured to impose a second-stage non-linear effect on the laser beam after the first-stage non-linear effect is imposed, so that the ultra-short pulse with modulation instability is evolved into a near-infrared-to-mid-infrared supercontinuum, so that an ultra-wideband supercontinuum covering visible, near-infrared, and mid-infrared bands is output.

Further, the band of the first-band laser is 1 μm, and the band of the second-band laser is 1.5 μm or 2 μm.

Further, two input ends of the wavelength division multiplexer are connected to the first fiber laser and the second fiber laser respectively, and the output end of the wavelength division multiplexer is connected to one end of the silica PCF by.

Further, the ultra-wideband supercontinuum light source further includes a dual-band fiber amplifier configured to amplify the first-band laser beam and the second-band laser beam simultaneously; and the wavelength division multiplexer is connected to the silica PCF by using the dual-band fiber amplifier.

Further, the dual-band fiber amplifier includes:

a pump beam combiner, configured to combine multiple pump laser beams;

an Er—Yb co-doped double-clad fiber, connected between an output end of the pump beam combiner and the silica PCF; and a pump source, configured to pump the Er—Yb co-doped double-clad fiber by using the pump beam combiner.

Further, the pump source is a 915 nm or 976 nm semiconductor laser.

Further, the first fiber laser and the second fiber laser are connected to the wavelength division multiplexer respectively by using a fiber isolator.

In the present invention, two fiber lasers of different bands are used as seed sources to form a dual-band fiber laser that outputs beams of two bands simultaneously, and the dual-band fiber laser is used to pump cascaded evolving assemblies. Specifically, when the laser beams of the two bands go through a first-stage evolving assembly, one part of the laser beam is evolved into a visible-to-near-infrared supercontinuum, while the other part of the laser beam is evolved into an ultra-short pulse; the visible-to-near-infrared supercontinuum and the ultra-short pulse are coupled and enter a second-stage evolving assembly; the ultra-short pulse is further evolved into a near-infrared-to-mid-infrared supercontinuum, in which the visible-to-near-infrared supercontinuum generated at the previous stage is transmitted in a low loss manner; and an ultra-wideband supercontinuum covering visible, near-infrared, and mid-infrared bands is finally output from cascaded fibers.

DESCRIPTION OF EMBODIMENTS

To make the objectives, technical solutions, and advantages of the present invention more comprehensible, the following further describes the present invention in detail with reference to the accompanying drawings and embodiments. It is understandable that the specific embodiments described herein are only used to explain the present invention and are not intended to limit the present invention.

Figure 1:
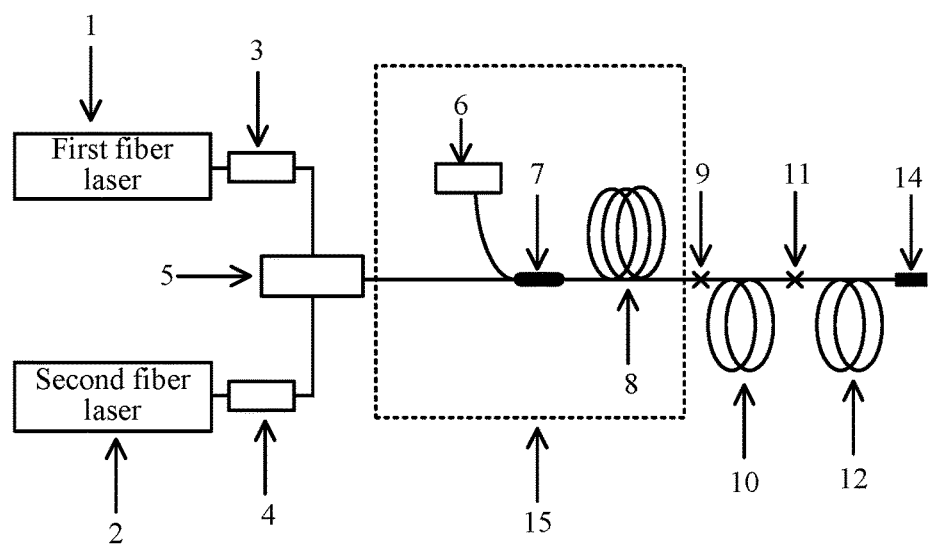
FIG. 1 is a structural diagram of an ultra-wideband supercontinuum light source based on an Er—Yb co-doped fiber amplifier according to a first embodiment of the present invention.

In the present invention, two fiber lasers of 1 µm and 1.5 µm bands are used as seed sources, and the two laser seeds are amplified by using an Er—Yb co-doped fiber amplifier, to implement a dual-band fiber laser that can output laser beams of 1 µm and 1.5 µm bands simultaneously, and the dual-band fiber laser is used to pump cascaded fibers formed by a silica PCF and a non-silica fiber. When the beams of the two bands go through the previous-stage silica PCF in the cascaded fibers, the 1 µm laser beam is evolved into a visible-to-near-infrared supercontinuum, while the 1.5 µm laser beam is evolved into an ultra-short pulse; the visible-to-near-infrared supercontinuum and the ultra-short pulse are coupled and enter the next-stage non-silica glass fiber; then, the 1.5 µm ultra-short pulse is evolved into a near-infrared-to-mid-infrared supercontinuum in the next-stage non-silica glass fiber, while the visible-to-near-infrared supercontinuum generated at the previous stage is transmitted in the next-stage non-silica glass fiber in a low loss manner; and an ultra-wideband supercontinuum covering visible, near-infrared, and mid-infrared bands is finally output from the cascaded fibers. The specific structure is shown in FIG. 1.

A first fiber laser 1 and a second fiber laser 2 are lasers of different wavebands. Specifically, the first fiber laser 1 is a 1 µm fiber laser, and the second fiber laser 2 is a 1.5 µm or 2 µm fiber laser. The two fiber lasers are used as amplified seed sources of dual bands. Both the two fiber lasers may be pulse laser or be continuous laser, or one of the two fiber lasers is continuous laser and the other one is pulse laser. If both the two fiber lasers use a pulse output mode, two pulses may be synchronous pulses or be asynchronous pulses.

A wavelength division multiplexer (Wavelength Division Multiplexing, WDM for short) 5 is configured to multiplex laser beams output by the first fiber laser 1 and the second fiber laser 2 into a same fiber. The first fiber laser 1 and the wavelength division multiplexer 5 are connected by using a 1 µm fiber isolator 3, while the second fiber laser 2 and the wavelength division multiplexer 5 are connected by using a 1.5 µm or 2 µm fiber isolator 4, to ensure one-way transmission of laser beams and prevent laser beams fed back by a next-stage system from damaging a previous-stage fiber laser, thereby ensuring stable operation of the system.

A pump beam combiner 7, a semiconductor laser pump source 6, and an Er—Yb co-doped double-clad fiber 8 form a dual-band fiber amplifier 15 of 1 µm and 1.5 µm or 1 µm and 2 µm; the dual-band fiber amplifier 15 simultaneously amplifies dual-band seeds coming from the WDM output end to output 1 µm and 1.5 µm high-power laser beams.

A silica PCF 10 imposes a first-stage non-linear effect on the input 1 µm and 1.5 µm dual-band laser beams, where the 1 µm laser beam is evolved into a visible-to-near-infrared supercontinuum and the 1.5 µm laser beam is evolved into an ultra-short pulse through modulation instability.

A non-silica glass fiber 12 imposes a second-stage non-linear effect on the visible-to-near-infrared supercontinuum and the 1.5 µm/2 µm ultra-short pulse with modulation instability that are received from the previous-stage silica PCF 10, where the 1.5 µm/2 µm ultra-short pulse is evolved into a near-infrared-to-mid-infrared supercontinuum and the visible-to-near-infrared supercontinuum generated at the previous stage is transmitted in a low loss manner; and an ultra-wideband supercontinuum covering visible, near-infrared, and mid-infrared bands is finally output from an end cap 14 in the cascaded fibers. In FIG. 1, 9 represents a splicing point between a pigtail of the Er—Yb co-doped double-clad fiber 8 and the silica PCF 10, and 11 represents a coupling point between the silica PCF 10 and the non-silica glass fiber 12.

Figure 2:
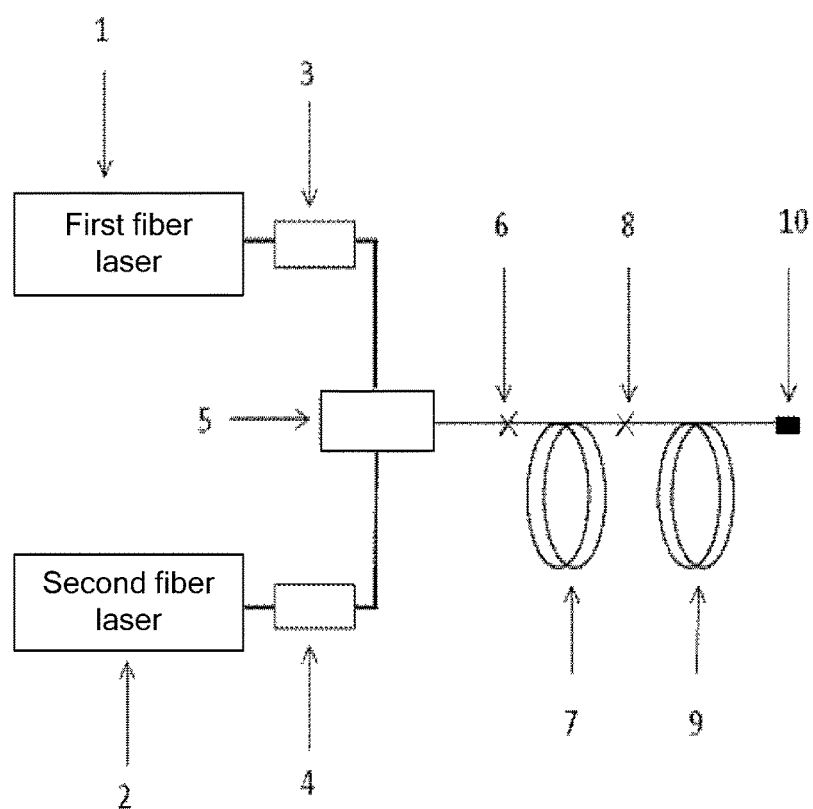
FIG. 2 is a structural diagram of an ultra-wideband supercontinuum light source based on a non-Er—Yb co-doped fiber amplifier according to a second embodiment of the present invention.

Assuredly, in a second embodiment of the present invention, the fiber amplifier formed by the pump beam combiner 7, the semiconductor laser pump source 6, and the Er—Yb co-doped double-clad fiber 8 may be removed from the system, and a high-power WDM is used to multiplex 1 µm and 1.5 µm high-power fiber lasers (or 1 µm and 2 µm high-power fiber lasers); an output end of the high-power WDM is directly connected to a cascaded fiber of a silica PCF/ZBLAN (Fluoride fiber) to perform dual-band pumping on the fiber. By using a same fiber non-linear optical principle, an ultra-wideband supercontinuum covering visible, near-infrared, and mid-infrared bands may also be output. As shown in FIG. 2, 6 represents a splicing point between an output fiber of a high-power WDM 6 and a silica PCF 7, and 8 represents a coupling point between the silica PCF 7 and a non-silica glass fiber 9.

1 µm/1.5 µm or 1 µm/2 µm dual-band lasers are used to pump cascaded fibers formed by the silica PCF and non-silica glass fiber. Because 1 µm and 1.5 µm/2 µm laser beams in the two bands correspond to an optimal pumping wavelength region of the silica PCF and the non-silica glass fiber respectively, a visible-to-near-infrared supercontinuum is generated from the 1 µm laser beam in the silica PCF, while a near-infrared-to-mid-infrared supercontinuum is generated from the 1.5 µm/2 µm laser beam in the non-silica glass fiber; and an ultra-wideband supercontinuum covering visible, near-infrared, and mid-infrared bands is finally output by using the cascaded fibers.

A specific working principle is as follows:

To ensure high-power operation of the Er—Yb co-doped fiber amplifier, an amplified spontaneous emission (Yb-ASE) of an Yb band needs to be eliminated, to avoid poor phenomena such as parasitic oscillation and self-pulsing. In addition, by injecting another 1 μm laser seed at the 1.5 μm laser seed ends of the Er—Yb co-doped fiber amplifier simultaneously, the Yb-ASE may be converted into an Yb laser beam and output, which further improves system stability and laser conversion efficiency of the Er—Yb co-doped fiber. In the present invention, the Er—Yb co-doped fiber amplifier is used to amplify 1 μm and 1.5 μm laser seeds simultaneously, to implement high-power output of 1 μm and 1.5 μm laser beams.

The 1 μm laser beam is located in an anomalous dispersion region near the zero dispersion wavelength of a silica PCF. Through non-linear effects such as modulation instability, soliton self-frequency shift, cross-phase modulation, four-wave mixing, and soliton capturing, an ultra-wideband supercontinuum covering visible-to-near-infrared bands is generated. The 1.5 μm or 2 μm laser beam is located in an anomalous dispersion region far away from the zero dispersion wavelength of the silica PCF. Through non-linear effects such as modulation instability, an ultra-shot pulse with modulation instability is generated.

A fiber material with low loss for the visible-to-near-infrared bands is used as a non-silica glass fiber, which ensures that the visible-to-near-infrared supercontinuum generated in the silica PCF can be transmitted in a low loss manner. However, the 1.5 μm or 2 μm ultra-short pulse generated in the silica PCF reaches the anomalous dispersion region after a stimulated Raman scattering effect is imposed in the non-silica glass fiber, and further, a supercontinuum covering near-infrared-to-mid-infrared bands is generated through non-linear effects such as modulation instability, soliton self-frequency shift, cross-phase modulation, four-wave mixing, and soliton capturing. By combining the visible-to-near-infrared supercontinuum generated in the previous-stage fiber, an ultra-wideband supercontinuum covering visible, near-infrared, and mid-infrared bands is finally output.

In conclusion, in the present invention, an ultra-wideband supercontinuum covering visible, near-infrared, and mid-infrared bands can be implemented; by adjusting power comparison of 1 μm and 1.5 μm/2 μm laser seeds, flatness of the supercontinuum and energy distribution of the supercontinuum at different spectral bands can be controlled. In addition, the apparatus has advantages of high-power and all-fiber, and is applicable to requirements in various application fields.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

The invention claimed is:

1. An ultra-wideband supercontinuum light source based on a dual-band fiber laser, wherein the ultra-wideband supercontinuum light source comprises:

a first fiber laser, configured to generate a first-band laser beam, wherein the first-band laser beam is used to be evolved into a visible-to-near-infrared supercontinuum;

a second fiber laser, configured to generate a second-band laser beam, wherein the second-band laser beam is used to be evolved into a near-infrared-to-mid-infrared supercontinuum;

a wavelength division multiplexer, configured to combine the first-band laser beam and the second-band laser beam;

a dual-band fiber amplifier configured to amplify the first-band laser beam and the second-band laser beam simultaneously;

a silica PCF, one end of which is connected to an output end of the wavelength division multiplexer by using a fiber, and which is configured to output a laser beam after a first-stage non-linear effect is imposed on the combined laser beam, so that the first-band laser beam is evolved into a visible-to-near-infrared supercontinuum and that the second-band laser beam is evolved into an ultra-short pulse through modulation instability, wherein the wavelength division multiplexer is connected to the silica PCF by using the dual-band fiber amplifier, wherein the dual-band fiber amplifier comprises: a pump beam combiner, configured to combine multiple pump laser beams; an Er—Yb co-doped double-clad fiber, connected between an output end of the pump beam combiner and the silica PCF; and a pump source, configured to pump the Er—Yb co-doped double-clad fiber by using the pump beam combiner; and a non-silica glass fiber, one end of which is connected to an output end of the silica PCF by using a fiber, and which is configured to impose a second-stage non-linear effect on the laser beam after the first-stage non-linear effect is imposed, so that the ultra-short pulse with modulation instability is evolved into a near-infrared-to-mid-infrared supercontinuum, so that an ultra-wideband supercontinuum covering visible, near-infrared, and mid-infrared bands is output.

2. The ultra-wideband supercontinuum light source according to claim 1, wherein the band of the first-band laser is 1 μm and the band of the second-band laser is 1.5 μm or 2 μm.

3. The ultra-wideband supercontinuum light source according to claim 1, wherein two input ends of the wavelength division multiplexer are connected to the first fiber laser and the second fiber laser respectively, and the output end of the wavelength division multiplexer is connected to one end of the silica PCF by using a fiber.

4. The ultra-wideband supercontinuum light source according to claim 1, wherein the pump source is a 915 nm or 976 nm semiconductor laser.

5. The ultra-wideband supercontinuum light source according to claim 1, wherein the first fiber laser and the second fiber laser are connected to the wavelength division multiplexer respectively by using a fiber isolator.

* * * * *